May 8, 1923.
O. E. HUEBNER
POTENTIAL INDICATOR
Filed July 5, 1921
1,454,474
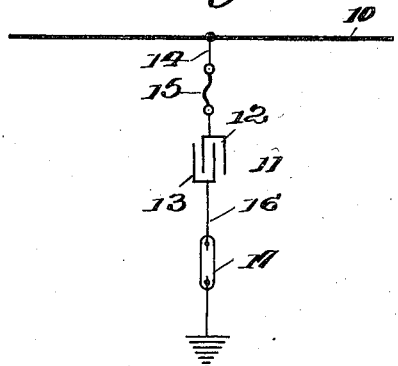
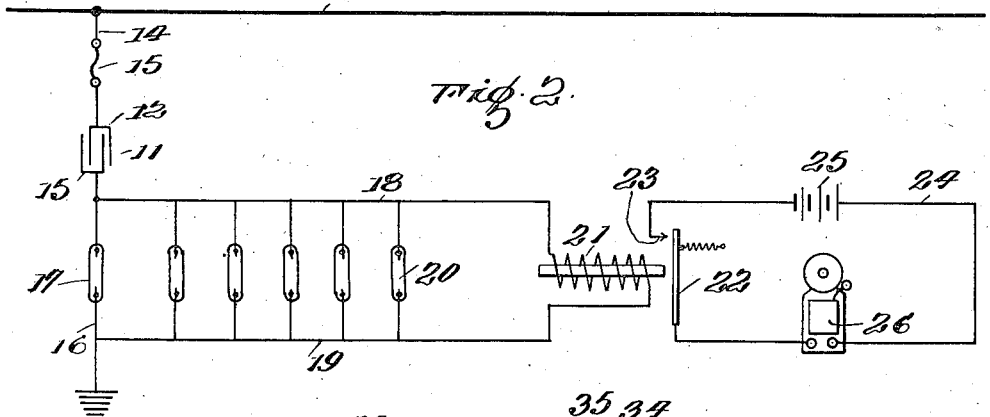
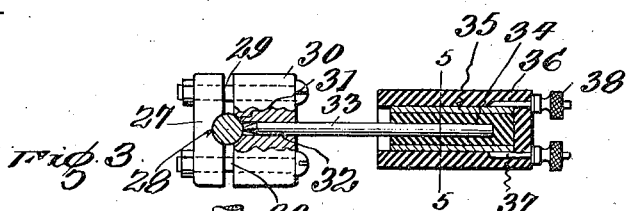
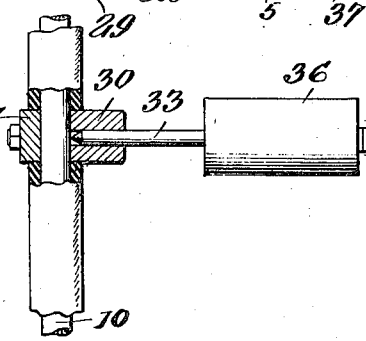
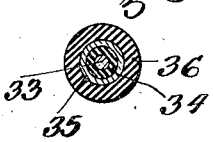
Otto E. Huebner
INVENTOR
BY ATTORNEY Patented May 8, 1923.

1,454,474

UNITED STATES PATENT OFFICE.

OTTO E. HUEBNER, OF RICHMOND HILL, NEW YORK.

POTENTIAL INDICATOR.

Application filed July 5, 1921. Serial No. 482,643.

*To all whom it may concern:*

Be it known that I, OTTO E. HUEBNER, a citizen of the United States, residing at Richmond Hill, in the county of Kings and State of New York, have invented certain new and useful Improvements in Potential Indicators, of which the following is a specification.

This invention has relation to electrical testing apparatus, and has for an object to provide what I term a potential indicator for the purpose of indicating the presence of potential or electric current in a cable, or other metallic conductor.
Another object of the invention is to provide a very inexpensive and simple apparatus intended primarily for use in power stations, transformer stations or other points of distribution and transformation of electric current for the purpose of detecting the existence and location of charged metallic conductors on switchboards, generators or the like and to indicate approximately the quantity of electrical potential in terms of voltage.

A still further object of the invention is to provide an electrical potential indicator having the characteristics above set forth and consisting specifically of a means for attachment in a metallic conductor to constitute an intermediatory conducting means, an element consisting primarily of a conductor adapted for electrical connection to said intermediatory conductor, and an electrical detecting apparatus of any desired type capable of indicating visibly or audibly the presence of electric current fluctuations in the condenser, which will be induced if the said metallic conductor is charged.
In addition with the foregoing this invention comprehends improvements in the details of construction and arrangement of parts to be hereinafter described and particularly set forth in the appended claims.
In the accompanying drawings in which similar and corresponding parts are designated by the same characters of reference throughout the several views in which they appear, Figure 1 is a diagrammatic view illustrating the essential elements of an apparatus constructed in accordance with my invention.

Figure 2 is a diagrammatic view illustrating more in detail the manner in which the elements are cooperatively connected to produce audible signals.

Figure 3 is a view in horizontal section taken through the intermediatory conductor and condensing portion of my apparatus.

Figure 4 is a view thereof in side elevation with parts broken away, and

Figure 5 is a transverse section taken on the line 5—5 of Figure 3.

With reference to the drawings, 10 indicates a conductor such as a cable, bus-bar or the like, and 11 indicates generally and diagrammatically a condenser consisting of the condenser plates 12 and 13. The plate 12 is electrically connected with the conductor 10 by means of the lead 14, said lead preferably having a fuse 15 interposed therein as diagrammatically illustrated. The plate 13 is grounded by means of the conductor 16. Numeral 17 indicates an electrically operable indicator of any suitable type interposed in said conductor. The member 17 may be a Geissler tube, or in fact any kind of device capable of manifesting any audible or visible signal upon the passage of current therethrough.

It will be obvious from this arrangement that while the conductor 10 is not directly grounded, nevertheless the condenser affords a medium for the creation of a surging current through the indicator 17 under the influence of potential presence in the conductor 10 with the result that, if the member 17 is a Geissler tube it will glow and thus indicate the fact that the member 10 is charged. The strength of the di-electric separating the condenser plates 12 and 13 should be sufficient to prevent the passage of a disrupting charge through the di-electric but in the event that the di-electric should not be capable of holding back the current I provide the fuse 15 which will obviously blow out before damage to the condenser is permitted.

I have illustrated in Figure 2 identically the same arrangement as described above with the exception that an additional number of the indicators 17 are connected in parallel by means of the leads 18 and 19, the former being connected at one end to the lead 16 above the indicator and the lead 19 to said conductor 16 below the indicator. A number of other indicators 20 are then bridged across the leads 18 and 19 as shown. The opposite extremities of the leads 18 and 19 are connected to the electromagnet 21 of a relay, the other portion of which consists of the movable armature 22, adapted, when the magnet 21 is energized to be attracted thereto and to make contact with the stationary contact point 23 and armature 22 as shown and has a source of current 25 interposed therein and also an audible signal 26.

From the foregoing it will be obvious that if the conductor 10 is charged the alternating current surging through the conductor 16 will branch to the leads 18 and 19, energizing the Geissler tubes 20 and also the electromagnet 21, which, as a result causes the armature 22 to be attracted thereto thus completing the circuit 24. This will be true particularly if the magnet 21 and armature 22 are polarized, although it will be obvious that any form of relay that will operate may be used. As a result of this operation the audible signal 26 is actuated to render the fact known that the cable 10 is charged.

It is my desire to embody the elements of the apparatus described above in a convenient form suitable for transportation and for ready manipulation as occasion requires. To that end I have devised a specific form of clamp shown in Figures 3 and 4 and which consists essentially of the base member 27 having its semi-circular recess 28 formed in one side to receive the bare wire of a cable after the insulation has been scraped therefrom. Said member 27 is also provided with a pair of transversely extending openings to receive bolts 29. A second member 30 is provided also adapted for contact with the wire or cable and to that end having a semi-circular recess 31 therein and transverse opening to receive the bolts 29. A transverse passage 32 is provided which passes entirely through the block 30 and intersects the recess 31 as shown for the purpose of receiving the end of a rod 32 which is preferably pointed so that it may engage the cable 10 and make a positive contact therewith. The opposite end of the rod 32 is seated within a cylindrical member 34 of insulating material. Surrounding said member 34 is a sleeve 35 of conducting material and said sleeve is further inserted within a casing 36 of insulating material. Two or more conducting extensions 37 are lead off longitudinally from the side of sleeve 35 and are threaded to receive the thumb screws 38 constituting binding posts for a purpose to be presently noted.

It will be apparent from this description that the rod 33 and sleeve 35 constitute the equivalent of the condenser plates 12 and 13 of the condenser 11 mentioned above. The cylindrical element 34 constitutes the dielectric.

In use, the clamp is embraced about the cable, bus-bar or other conductor which is to be tested and normally forms a permanent part thereof to be used only at such times as the cable is to be tested. When occasion requires the condenser portion of the mechanism is brought into use and the end of the rod 33 is inserted within the channel 32 so as to contact with the cable, and also by contacting with the side of the block 30 provides an uninterrupted passage for the current to the condenser. The Geissler tube 17, lead 16 or any other portion of the balance of the apparatus is then connected to one or the other of the binding posts 38 thus providing in the elements the mechanism shown in Figure 1. The operation of this detailed structure should be obvious from the foregoing description.

Thus, it will be seen that I have provided a novel form of testing apparatus designed to ascertain the presence of potential in a conductor charged with alternating current and which is extremely simple in construction thus enabling the same to be economically manufactured and eliminating the use of expensive testing devices which are in use at the present time. It is well known that the operability of a Geissler tube depends upon certain factors, such for instance, as the degree of vacuum in the tube, the distance between the electrodes and so forth. With these facts in mind it will be readily seen that this arrangement may afford a means for approximately determining the voltage of a high tension current since a number of Geissler tubes having varying degrees of vacuum may be employed, testing one after the other across the terminals of the device until one is found that will glow. Another method would be to interpose in the conductor 16 an electrostatic device of the type having a stationary and a movable plate, the latter when charged moving toward the stationary plate to an extent depending upon the voltage of the charge. To those familiar with the art to which this invention appertains there will occur many and varied uses to which this device may be put from the brief description given above and hence I do not consider it necessary to go further in detail but claim every use to which the device may be put and every variation of operation and manipulation thereof to accomplish whatever purpose the mechanism is inherently capable of.

While I have illustrated and described my invention with some degree of particularity I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. An electrical testing device including a two part clamp adapted to embrace a cable or the like, one member having an opening, a second element consisting of a cylindrical casing of insulating material, a conducting sleeve inserted in said casing, binding posts connected to said sleeve, a plug inserted in said sleeve, said plug being of insulating material having a recess, and rod seated in said recess adapted to enter the opening of the clamp, said rod and metallic sleeve constituting both sides of a condenser and the plug constituting the di-electric interposed therebetween.

2. An electrical testing device including a clamp having an opening; a second element comprising an insulated casing, an annular conducting element therein, an insulating plug within said annular element, a rod inserted in said plug and adapted for insertion in the opening of the clamp, and binding posts connected to said annular conductor.

3. An electric testing apparatus comprising a sleeve of insulating material, a metallic conducting sleeve inserted therein, binding posts connected to said sleeve, a plug inserted within said sleeve of insulating material said plug having a recess, and a rod inserted in said recess, said rod and metallic sleeve constituting opposite sides of a condenser and the plug constituting the di-electric interposed therebetween.

In testimony whereof I affix my signature.

OTTO E. HUEBNER. [L. S.]